(12) United States Patent
Geris et al.

(10) Patent No.: US 9,184,622 B2
(45) Date of Patent: Nov. 10, 2015

(54) POWER PACK CHARGING FROM INTERMITTENT SOURCES

(75) Inventors: Ryan Alexander Geris, Kitchener (CA); Mukesh Coobial, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 852 days.

(21) Appl. No.: 13/443,072

(22) Filed: Apr. 10, 2012

(65) Prior Publication Data
US 2013/0264992 A1  Oct. 10, 2013

(51) Int. Cl.
| | |
|---|---|
| H02J 7/00 | (2006.01) |
| H01M 10/44 | (2006.01) |
| H01M 10/46 | (2006.01) |
| H02J 7/34 | (2006.01) |

(52) U.S. Cl.
CPC ..................................... *H02J 7/34* (2013.01)

(58) Field of Classification Search
USPC .................................................. 320/101, 109
See application file for complete search history.

(56) References Cited

U.S. PATENT DOCUMENTS

| 7,884,569 B2 | 2/2011 | Ward | |
|---|---|---|---|
| 2001/0043050 A1* | 11/2001 | Fisher, Jr. | .................... 320/101 |
| 2006/0174939 A1 | 8/2006 | Matan | |
| 2008/0191675 A1 | 8/2008 | Besser et al. | |
| 2009/0072780 A1 | 3/2009 | Lee et al. | |
| 2009/0266397 A1 | 10/2009 | Gibson et al. | |
| 2010/0035664 A1 | 2/2010 | Liu | |
| 2010/0313931 A1 | 12/2010 | Yoneda et al. | |
| 2012/0044014 A1 | 2/2012 | Stratakos et al. | |

FOREIGN PATENT DOCUMENTS

GB  2473524  3/2011

OTHER PUBLICATIONS

EESR dated Nov. 2, 2012 for EP 12163627.
Canadian Office Action dated Feb. 26, 2015 received for Canadian Application No. 2,811,859.

* cited by examiner

*Primary Examiner* — Samuel Berhanu
(74) *Attorney, Agent, or Firm* — Jeffrey N. Giunta; Fleit Gibbons Gutman Bongini & Bianco P.L.

(57) ABSTRACT

Systems and methods to control charging of power packs. Capacities of a first and second power pack associated with a charging station are monitored. When an energy harvesting device is producing energy, it is connected to a rechargeable device when the capacities of the first and second power pack are below a respective threshold. When the energy harvesting device is producing energy, it is connected to the first power pack and the second power pack is connected to the rechargeable device when the first power pack capacity is below a first threshold and the second power pack capacity is above a second threshold. The second power pack is connected to the rechargeable device when the energy harvesting device is not producing energy, the first power pack capacity is below the first threshold, and the second power pack capacity is above the second threshold.

20 Claims, 5 Drawing Sheets

POWER PACK CHARGING FROM INTERMITTENT SOURCES

FIELD OF THE DISCLOSURE

The present disclosure generally relates to power pack charging stations and more particularly to controlling the charging of power packs from intermittent energy sources.

BACKGROUND

Energy harvesting devices, such as devices or systems that produce electrical current by harvesting energy from renewable resources, are increasingly used to provide power pack charging energy to rechargeable devices. For example, solar cells harvest energy from sunlight or other light sources and produce electrical current. Another example is wind power generators that harvest energy from the wind to turn mechanical electrical generators that provide electrical current.

Although the advantages of using renewable energy are well known, energy harvesting devices that harvest energy from many types of renewable energy sources are subject to the energy output fluctuations and intermittent availability of their originating energy sources. For example, sunlight available to a solar cell varies during the day due to cloud cover and other factors, and is completely unavailable at night. Wind powered generators are also subject to fluctuating output based on varying winds, and may have long periods of no output due to long periods of calm winds.

Some energy harvesting systems accommodate periods of no output due to the unavailability of the energy source being harvested by using rechargeable batteries to store harvested energy. The energy stored in these rechargeable batteries is used when the energy harvesting device is not harvesting energy. Such devices, particularly less expensive device charging stations, switch between drawing energy from either the energy harvesting device or the rechargeable battery. In an application of a rechargeable device charging station, the energy harvesting device generally has an electrical current output that is below the power that can be used to charge the batteries or other power packs within the rechargeable device. Using only the electrical current available from the energy harvesting device to recharge a battery of a rechargeable device often results in long charging times.

The usability of charging stations that draw energy from intermittent and fluctuating energy harvesting devices is limited by the low output electrical current of the energy harvesting devices relative to the maximum charging current that can be accepted by a device being recharged.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
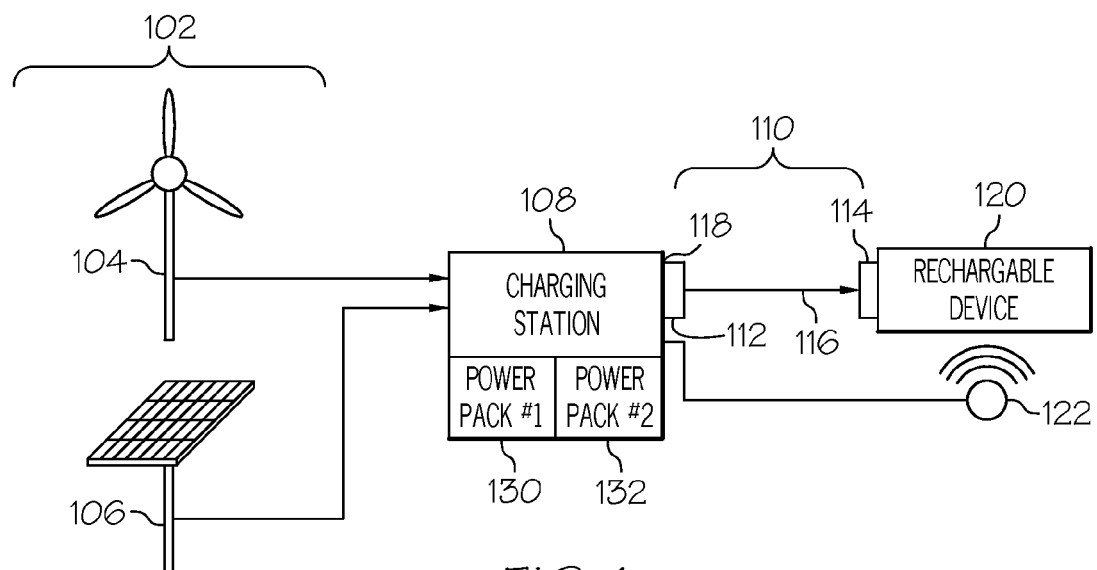
FIG. 1 illustrates a device power pack charging configuration, according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," and encompasses the coupling of devices that may be physically, electrically or communicatively connected (according to context), although the coupling may not necessarily be directly, and not necessarily be mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

In the following discussion, power pack capacity refers to a present energy capacity, i.e., a measure of the present capability to supply electrical energy of a power pack, such as a battery. In the following discussion, the term power pack or battery capacity refers to the presently stored energy level of the power pack, in contrast to the "total designed capacity" of a power pack, which is the maximum amount of energy that can be stored by the power pack when that power pack is fully charged and in a new condition. For example, power pack capacity may refer to a number of Amp-Hours remaining within a battery or a percentage of the battery's total designed capacity when fully charged. Power pack capacity as used below generally refers to a charge level of a battery or a comparable measure of any suitable power pack. As used below, the rated capacity of a power pack is the total useable energy that a power pack is able to store in a new condition.

Described below are systems and methods that provide a rechargeable power pack charging station that includes a cost efficient design to harvest energy using energy harvesting devices and still deliver fast charging times for rechargeable devices connected thereto. The below described system and methods collect energy by using energy harvesting devices, such as solar cells or wind powered generators, and that store the harvested energy into energy storage components, such as rechargeable power packs or batteries. The energy stored in the rechargeable power packs is then used to charge a rechargeable device connected to the device charging station. Using energy stored in rechargeable power packs allows an efficient transfer of harvested energy to a rechargeable device at a charging electrical current level that is not limited by the output current of the energy harvesting device.

In general, these energy harvesting devices are intermittent suppliers of energy and are subject to output fluctuations. The charging station is designed to best utilize the energy produced by the energy harvesting devices when conditions are such that the energy harvesting devices are producing energy. In the example of solar cells, the energy harvesting devices only produce energy when enough light is available. In the example of wind powered generators, energy is only produced when sufficient winds are present to drive the generator. The energy harvesting devices also produce electrical energy that fluctuates due to the variable intensity of the energy sources from which they harvest energy.

In the below described examples, a charging station includes two rechargeable power packs, such as rechargeable batteries of various chemical compositions, that are associated with the charging station. In some embodiments, the charging station may include more or fewer power packs, such as batteries. These power packs may each have different or substantially similar total design capacities. In many of the illustrative examples described below, the power packs each have different total design capacities, i.e., the total amount of energy the power pack is able to store when fully charged. These power packs that are associated with the charging station are also able to be contained within the charging station or they are able to be remote from the charging station but they are electrically connected to the charging station.

In general, when a rechargeable device is connected to the charging station, the rechargeable device receives electrical charging current via one or more charging outputs on the charging station. The element or elements supplying or delivering the electrical charging current to the charging output (and thereby to the rechargeable device) may vary, however, according to the circumstances. For example, charging current may be supplied from one of the rechargeable power packs if the capacity, or state of charge, of that rechargeable power pack is above a threshold. If the energy harvesting device is also producing energy, the energy harvesting device is connected to the other rechargeable power pack to prepare that other rechargeable power pack to deliver electrical charging current to the rechargeable device. In this configuration, if a first charging station battery has sufficient capacity, i.e., it is above the threshold, it is connected to the charging output (thereby supplying charging current to the rechargeable device) while the second charging station battery is being charged by the energy harvesting device in preparation to provide charging energy to the rechargeable device.

If none of the rechargeable power packs associated with the charging station have sufficient capacity to provide charging current to the rechargeable device, the energy harvesting device is connected to the rechargeable device so as to provide its output as electrical charging current to the rechargeable device. If the energy harvesting device is not producing energy, the rechargeable device is connected to either of the rechargeable power packs associated with the charging station so that rechargeable power pack provides electrical charging current to the rechargeable device. When no rechargeable device is connected to the charging station, the output of the energy harvesting device is used to charge the two rechargeable power packs to allow the harvested energy to be used when a rechargeable device is connected to the charging device.

In one example, when the energy harvesting device is producing electrical current, the electrical current produced by the energy harvesting device is able to be provided in parallel to a connected rechargeable device along with electrical charging current that is provided by one or more rechargeable power packs. In one example, a respective voltage regulator is connected to the outputs of the energy harvesting device and each rechargeable power pack to cause the voltage of the electrical charging current that is produced by the energy harvesting device and the rechargeable power packs to be substantially equal, thereby allowing the electrical charging current of each of those sources to be delivered to the rechargeable device. In one example, the energy harvesting device delivers electrical charging current in parallel with one or more rechargeable power packs when the respective capacity of one or both rechargeable power packs is above a threshold.

The below described systems and methods allow more efficient utilization of energy recovered by the energy recovery devices. By storing the recovered energy into rechargeable power packs, such as batteries, the energy is able to be more efficiently transferred to a device being recharged. The rechargeable power packs exhibit, for example, a more constant voltage and current capability that does not vary according to the availability of the source from which an energy recovery device is recovering energy. The more constant voltage and current capability of the rechargeable power packs allow charging operations to occur at higher average electrical current values and less buck-boost voltage regulation, which may introduce inefficiencies and waste energy, is required. This efficient utilization may also reduce the time it takes for the rechargeable device to recharge.

FIG. 1 illustrates a device power pack charging configuration 100 according to one example. The device power pack charging configuration 100 illustrates a number of energy harvesting devices 102. In one example, energy harvesting devices 102 are electrical generators that are powered by renewable energy sources. As illustrated, the energy harvesting devices 102 include a wind powered electrical generator 104 and a solar panel 106. In general, the energy harvesting devices 102 are devices that harvest energy from any source and produce electrical current that is suitable for charging a power pack.

In one example, the energy harvesting devices are intermittent sources of electrical power. In the example of the wind powered electrical generator 104, electrical current is produced when sufficient wind energy is available to drive the wind powered electrical generator 104. In the case of the solar panel 106, electrical current is produced when there is sufficient light energy impinging on the solar panel 106 to cause electrical current production.

The energy harvesting devices 102 are electrically connected to a charging station 108. Charging station 108 includes control circuitry to route and control electrical current produced by the energy harvesting devices 102. The charging station 108 in one example is detachably connected to a rechargeable device 120 through a detachable connection 110. In a further example, the charging station supplies electrical energy to recharge power packs in the rechargeable device 120 through a wireless power connection 122 that uses, for example, a connectorless coupling to convey electrical energy to the rechargeable device 120.

The detachable connection 110, the wireless power connection 122, or both, operate to convey power pack charging energy to the rechargeable device 120 that is used to recharge power packs in the rechargeable device. In one example, the detachable connection 110, the wireless power connection 122, or both, are further able to convey data or other signals between the charging station 108 and the rechargeable device 120. In various examples, the rechargeable device 120 is a portable electronic device that includes rechargeable batteries that power the portable electronic device when it is not connected to charging station 108.

In some examples, the detachable connection 110 that connects the rechargeable device 120 to the charging station 108 includes a cable 116 with detachable connectors on each end. A first detachable connector 112 is on a first end of the cable 116 and a second detachable connector 114 is on the second end of the cable 116, the second end being opposite the first end. The first detachable connector 112 in one example connects to a charging output connector 118 that is mounted on the charging station 108. In one example, these detachable connectors conform to a connector standard defined for use with electronic devices conforming to the Universal Serial Bus standard.

In further examples, the detachable connection 110 includes a wireless coupling of charging energy between the charging station 108 and the rechargeable device 120. In one example, a detachable connection 110 includes an inductive coupling that transfers energy suitable to charge a power pack from the charging station 108 to the rechargeable device 120.

As discussed in greater detail below, the charging station 108 includes at least two rechargeable power packs that are able to accumulate energy from the energy harvesting devices 102. The illustrated charging station 108 is shown to include a first charging station power pack 130 and a second charging station power pack 132. In various modes of operation, the charging station transfers energy to a connected rechargeable device 120 from either the energy harvesting devices 102 or from one of the charging station power packs. Based upon the remaining power pack capacity of the internal power packs, energy available from the energy harvesting devices 102 is used to recharge either one of the charging station power packs or the rechargeable device 120. The power packs used in various charging stations 108 include, for example, rechargeable batteries, micro-battery cells (e.g., "button cells"), capacitors, or any electrical energy storage device.

Figure 2:
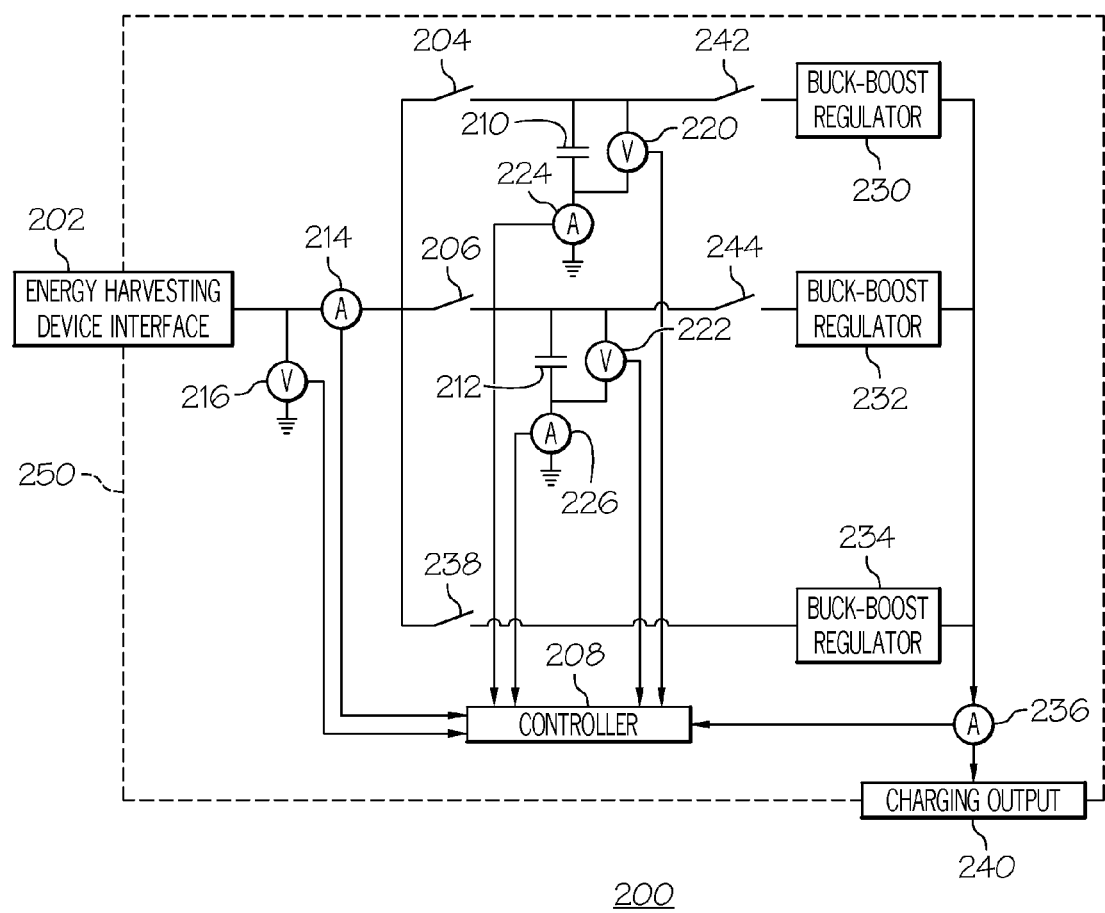
FIG. 2 illustrates a charging station circuit diagram, in accordance with one example.

FIG. 2 illustrates a charging station circuit diagram 200, in accordance with one example. The charging station circuit diagram 200 depicts the components of a charging station 250 that receives electrical energy through an energy harvesting device interface 202 and provides power pack charging energy out through a charging output 240. In general, the charging station 250 receives energy from energy harvesting devices such as the energy harvesting devices 102 that are described above with regards to FIG. 1. As discussed above, the energy harvesting devices connected to the charging station 250 through the energy harvesting device interface 202 generally provide energy intermittently based upon the sources from which they harvest energy. As described in further detail below, a controller 208 within the charging station 250 monitors various operational conditions associated with the charging station and controls delivering charging energy to a rechargeable device connected to the charging output port of the charging station that includes the charging output 240. In one example, the charging output 240 includes a charging output connector that is configured to detachable connect a rechargeable device.

The charging station 250 provides power pack charging energy to a charging output 240. The charging output 240 in one example is an electrical connector that is used to connect a rechargeable device to the charging station to recharge power packs within the rechargeable device. Examples of rechargeable devices are discussed above with regards to FIG. 1 and generally have one or more of various types of rechargeable power packs. In one example, a rechargeable device that includes rechargeable batteries connects to the charging output 240 to receive energy to charge the batteries in the rechargeable device. In another example, a rechargeable battery pack is able to be connected directly to the charging output 240. Rechargeable devices are able to connect directly to the charging output 240, or a cable (not shown) is able to be used to connect the rechargeable devices to the charging output 240.

In a further example, the charging output 240 is able to include a connectorless coupling that conveys charging energy between the charging station 250 and the rechargeable device. An example of a charging output 240 that includes a connectorless coupling is a charging output 240 that includes an inductive coupling structure to convey charging energy from the charging station 250 to the rechargeable device, such as the wireless power connection 122.

In various examples, the controller 208 is able to determine if a rechargeable device is connected to the charging output 240. In the illustrated example, an output ammeter 236 measures electrical charging current being delivered through the charging output 240 and reports the value of that electrical current to the controller 208. The controller 208 in one example, determines that a rechargeable device is connected to the charging output 240 if an amount of electrical charging current is measured to be flowing through the charging output 240. Based on that measurement, the controller 208 is able to determine that charging energy is to be routed to the charging output 240. In further examples, other technique are able to be used to determine if a rechargeable device is connected to the charging output 240, such as exchanging data with a rechargeable device that is connected to the charging output 240. Such data exchange is able to be through communications circuits that are incorporated in the various designs of the charging output 240, or by other communications circuits.

Electrical energy is received through the energy harvesting device interface 202 and is coupled to various components of the charging station 250. The charging station 250 in one example has its own set of two rechargeable charging station power packs, a first charging station power pack 210 and a second charging station power pack 212. In one example, the first charging station power pack 210 and the second charging station power pack 212 each includes a rechargeable battery, such as batteries that incorporate various rechargeable chemistries, such as Nickel-Cadmium or Nickel-Metal Hydride batteries. In various examples, the first charging station power pack 210 and the second charging station power pack 212 are able to consist of any type of energy retaining structure, such as chemical, mechanical, electromagnetic, and the like. In some examples, one or both of the first charging station power pack 210 and the second charging station power pack 212 are able to include capacitors (including "supercapacitors"), micro-battery cells such a "button cell," and the like.

The present discussion describes two charging station power packs and a single energy harvesting interface in order to simplify the description of certain aspects of this example. It is clear that further examples that include more than two charging station power packs and more than one energy harvesting interface or that operate with more than one energy harvesting system are able to incorporate the described aspects of the illustrated example.

The controller 208 of one example monitors the capacity of the first charging station power pack 210 and the second charging station power pack 212. In the following discussion, the term "capacity" of a power pack refers to the amount of electrical energy that is presently held by the power pack. Unless the power pack is fully charged, the capacity of the power pack is less than its maximum capacity, which is the maximum amount of energy the power pack is able to hold, generally when the power pack is fully charged. In the illustrated example, the capacity of each charging station power pack is monitored by a respective voltmeter.

The charging station circuit diagram 200 illustrates two monitoring mechanisms that are used by power pack capacity monitors for each charging station power pack. One monitoring mechanism monitors the output voltage of each charging station power pack. The illustrated examples of the first monitoring mechanism is illustrated by the first voltmeter 220, which is a power pack capacity monitor that monitors the first charging station power pack 210, and the second voltmeter 222, which is also a power pack capacity monitor that monitors the second charging station power pack 212. In the example of this monitoring mechanism, the output voltage of each power pack, as measured by the respective voltmeters, is reported to the controller 208. In one example, power packs of a particular design exhibit output voltages that are closely correlated to the capacity of the power pack. The controller 208 in one example is configured with data defining this correspondence to allow the power pack capacity of a particular power pack to be determined based upon its measured output voltage.

A second power pack capacity monitoring mechanism uses ammeters to integrate the electrical current flowing into and out of the power pack in order to estimate the capacity currently held in the power pack. The illustrated examples of this second monitoring mechanism is illustrated by a first ammeter 224, which is a power pack capacity monitor that measures electrical current flowing into and out of the first charging station power pack 210, and a second ammeter 226, which is also a power pack capacity monitor that measures electrical current flowing into and out of the second charging station power pack 212. These measured electrical current values are provided to the controller 208. In one example, the controller 208 is able to integrate these measured electrical current values over time to estimate the net amount of electrical current that has flowed into and out of the power pack, and thereby estimate its capacity.

A variation of the second monitoring mechanism uses power pack capacity monitors that are based on Coulomb counting battery "fuel gauge" circuits in place of the above described ammeters. In one example, these Coulomb counting battery fuel gauges are dedicated circuits that measure electrical current flowing into and out of the power pack and operates to maintain an integrated value of the electrical current flowing into and out of the power pack. The Column counting battery fuel gauge of one example is further configured to include processing to produce power pack capacity values to the controller 208.

The energy received through the energy harvesting device interface 202 is monitored by one or more of an energy harvesting device ammeter 214 and an energy harvesting device input voltmeter 216. These devices measure electrical current and voltage, respectively, produced by an energy harvesting device connected to the charging station 250. The energy harvesting device ammeter 214 and an energy harvesting device input voltmeter 216 produce electrical current and voltage measurements, respectively, that are each received in one example by controller 208. Based upon one or more of the measured energy harvesting device electrical current or voltage, the controller 208 determines that the energy harvesting device is producing electrical current. In further examples, other mechanisms are able to be used to determine if an energy harvesting device is producing electrical current. In one further example, a particular energy harvesting device is able to have an additional interface (not shown) that allows the external energy harvesting device to report to the controller 208 if it is producing electrical current.

Energy received through the energy harvesting device interface 202 is selectably routed to one of the charging station power packs or to the charging output 240 for delivery to a rechargeable device attached thereto. The controller 208 in one example determines where to route the electrical energy received through the energy harvesting device interface 202 based upon various measurements. In one example routing of electrical energy within the charging station 250 is controlled by the controller 208 based upon determined capacity values for the two charging station power packs. For example, if one of the charging station power packs is determined to have a capacity that is below a threshold and the other charging station power pack has a capacity that is above that threshold, energy received from the energy harvesting device interface 202, and therefore from one or more energy harvesting devices connected through the energy harvesting device interface 202, is directed to the charging station power pack with capacity that is below the threshold. In this example, the charging station power pack whose capacity is determined to be above the threshold is connected a rechargeable device that is connected to the charging output 240.

Routing of electrical energy received from the energy harvesting device interface 202 is controlled by three switches, a first input switch 204, a second input switch 206, and a third input switch 238. These three switches are controlled in one example by controller 208 to either conduct electrical energy or to isolate the two sides of the particular switch form one another. Controlling switches such as the first input switch 204, the second input switch 206 the third input switch 238, other switches or devices, or any combination of these, are examples of configuring a device to deliver energy or to route electrical currents or to otherwise perform a function. The first input switch 204 is able to selectably connect the energy harvesting device interface 202 to the first charging station power pack 210. The second input switch 206 is able to selectably connect the energy harvesting device interface 202 to the second charging station power pack 212. The third input switch 238 is able to selectably connect the energy harvesting device interface 202 to the charging output 240. In general, the controller 208 only configures one of these three switches to conduct electrical energy, thereby causing the other two to isolate the energy harvesting device interface 202 from the opposite side of those switches.

Each charging station power pack in one example provides electrical charging current through a respective output voltage regulator. Each output voltage regulator in one example is able to be configured to produce a specific output voltage. In various examples, the output voltage regulator is able to be constructed to produce an output voltage that is set by the design of the output voltage regulator, or the output voltage regulator is able to be controlled, such as by a command from the controller 208, to produce a particular output voltage. In one example, the voltage regulator is able to be configured to provide no regulation and to pass the output voltage of its connected charging station power pack without modification.

In the illustrated example, the first charging station power pack 210 is selectably connected to a first buck-boost regulator 230 through a first output switch 242. The second charging station power pack 212 is similarly connected to a second buck-boost regulator 232 through a second output switch 244. In one example, the controller 208 controls the first output switch 242 and the second output switch 244 to either conduct electrical energy from an input to an output of the switch, or to isolate the input from the output of the switch. In one example, when the first output switch 242 is configured to conduct electrical output, the controller 208 configures the second output switch 244 to isolate its input from its output.

Conversely, when the second output switch 244 is configured to conduct electrical output, the controller 208 configures the first output switch 242 to isolate its input from its output.

Based upon the configuration of the first output switch 242 and the second output switch 244, electrical energy from either the first charging station power pack 210 or the second charging station power pack 212 can supply electrical charging current to a rechargeable device connected to the charging output 240. When the first output switch 242 is configured to conduct energy, electrical energy from the first charging station power pack 210 is delivered through the first buck-boost regulator 230 to the charging output 240. When the second output switch 244 is configured to conduct energy, electrical energy from the second charging station power pack 212 is delivered through the second buck-boost regulator 232 to the charging output 240.

As is understood by practitioners of ordinary skill in the art, each buck-boost regulator operates to maintain a desired voltage at its output despite variations in the voltage produced by the power pack from which it is connected. Based upon the relationship between the power pack output voltage and the desired voltage to be output by the buck-boost regulator, the buck-boost regulator will either produce an output voltage that is reduced from its input voltage (i.e., buck) or produce an output voltage that is increased from its input voltage (i.e., boost).

As described in further detail below, an output switch associated with a charging station power pack that has a capacity above a threshold is configured to provide energy to the charging output 240. If neither charging station power pack has a respective capacity that is above that threshold, the energy harvesting device interface 202, and therefore the energy harvesting device connected thereto, is configured to deliver charging energy to a rechargeable device connected to the charging output 240. In the illustrated example, this configuration is performed by configuring the third input switch 238 to conduct electrical energy. In the illustrated example, the energy harvesting device interface 202 is connected to the charging output through a third buck-boost regulator 234.

Figure 3:
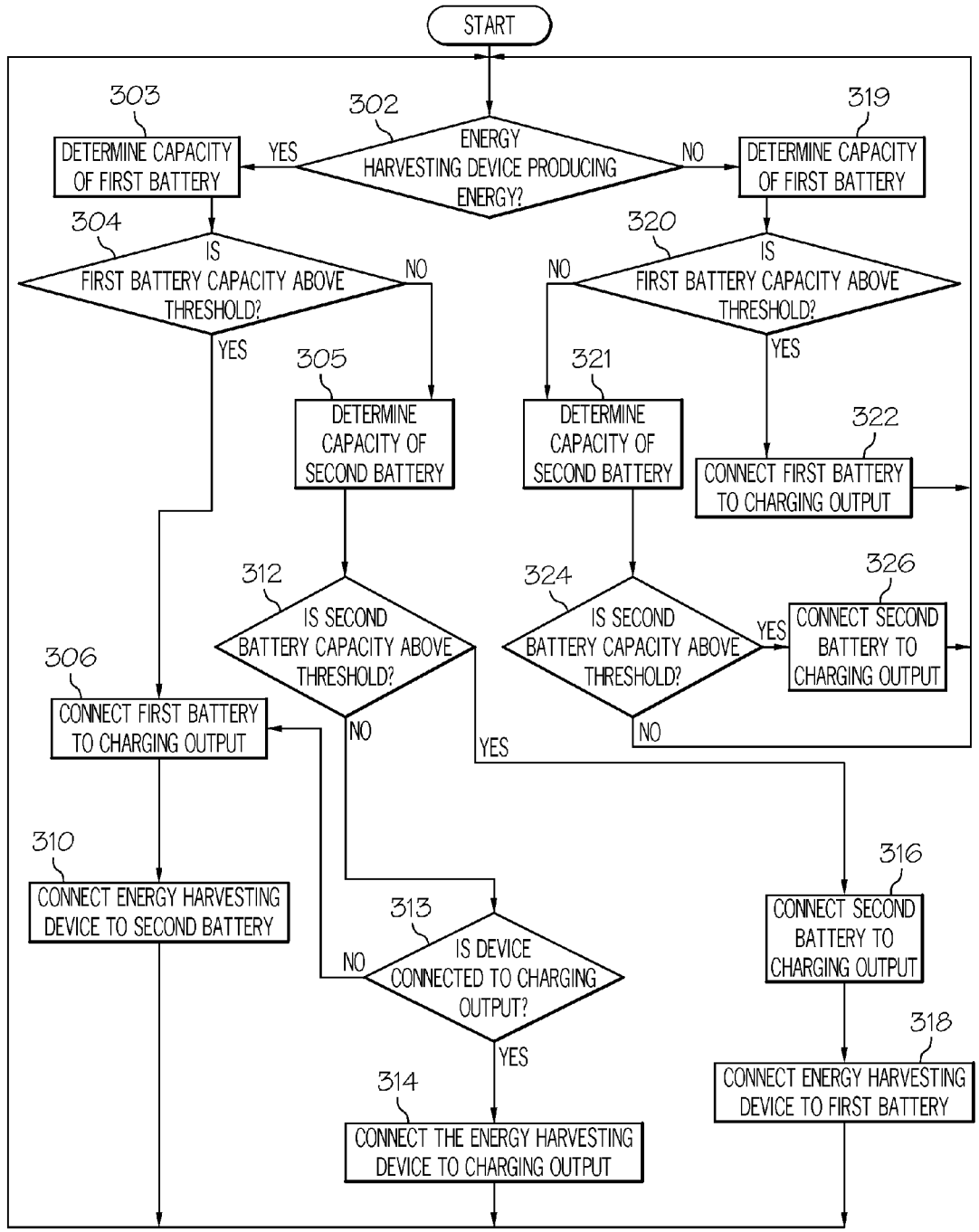
FIG. 3 illustrates a charging station control process, according to one example.

FIG. 3 illustrates a charging station control process 300, according to one example. The charging station control process 300 is performed in one example by the controller 208 described above with regards to FIG. 2. In the following description, the term first charging station battery refers to a component that is analogous to the first charging station power pack 210, and the term second charging station battery refers to a component that is analogous to the second charging station power pack 212. The first charging station battery and the second charging station battery are rechargeable power packs that are associated with a charging station being controlled by the charging station control process.

The term "charging output" used below is analogous to the charging output 240 described above with regards to FIG. 2. It is to be understood that the charging output described below is able to be, but is not required to be, connected to a rechargeable device that is to receive charging energy from the charging station whose controller is performing the charging station control process 300. In some examples, the charging output is able to refer to an internal interface within a device and the power packs connected to the charging output are able to be within the same device as the charging station components. The charging station control process operates to better utilize energy obtained from an energy harvesting device, such as the energy harvesting devices 102 discussed above with regards to FIG. 1, to recharge rechargeable devices.

The charging station control process 300 begins by determining, at 302, if an energy harvesting device is producing energy. As discussed above, a determination that an energy harvesting device is producing energy is able to be made by measuring one or more of a voltage and electrical current produced by the energy harvesting device, or by receiving status data from the energy harvesting device.

If it is determined that the energy harvesting device is producing energy, the charging station control process 300 continues by determining, at 303, a first battery capacity, which is a present capacity of the first charging station battery, and then determining, at 304, if the present capacity of a first charging station battery is above a threshold. If the capacity of the first charging station battery is above that threshold, the first charging station battery is connected, at 306, to the charging output of the charging station. The energy harvesting device is then connected, at 310, to the second charging station battery in order to charge the second charging station battery in preparation for future use. In this configuration, the first charging station battery has sufficient capacity, i.e., it is above the threshold, to provide charging energy to the rechargeable device connected to the charging output while the second charging station battery is being charged by the energy harvesting device in preparation for providing charging energy to the rechargeable device. In one example, connecting the energy harvesting device to the second charging station battery includes controlling current flow from the energy harvesting device into the second charging station battery to properly control charging and limit overcharging of the second charging station battery.

Returning to determining, at 304, if the first battery capacity is above a threshold, in the case where it is determined that the first battery capacity is not above the threshold, the charging station control process 300 determines, at 305, a second battery capacity, which is the present capacity of the second charging station battery, and then determines, at 312, if the second battery capacity is above a threshold. In various examples, the threshold to which the second battery capacity is compared is able to be the same threshold, or a different threshold, as to which the first battery capacity is compared in the above described processing. If it is determined that the second battery capacity is not above the threshold, the charging station control process 300 determines, at 313, if a rechargeable device is connected to the charging output.

If it is determined that a rechargeable device is not connected to the charging output, the charging station control process 300 connects, at 306, the first battery to the charging output 306 and connects, at 310, the energy harvesting device to the second battery. The charging station control process 300 then resumes to determining, at 302, if the energy harvesting device is producing energy. Returning to determining, at 313, if a rechargeable device is connected to the charging output, if it is determined that a rechargeable device is connected to the charging output, the charging station control process 300 connects, at 314, the energy harvesting device to the charging output 240. In this configuration, it is determined that neither the first charging station battery nor the second charging station battery has sufficient capacity to provide charging energy to the rechargeable device, i.e., both of the above determinations determined that their respective capacities were below the threshold, and therefore the energy harvesting device is used to provide charging energy to the rechargeable device.

Returning to determining, at 312, if the second battery capacity is above a threshold, in the case that it is determined that the second battery capacity is above the threshold, the charging station control process 300 connects, at 316, the second charging station battery to the charging output 240. The energy harvesting device is then connected, at 318, to the first charging station battery. In this configuration, the second charging station battery has sufficient capacity, i.e., it is above the threshold, to provide charging energy to the rechargeable device while the first charging station battery is being charged by the energy harvesting device in preparation to provide charging energy to the rechargeable device. As discussed above, connecting the energy harvesting device to the first charging station battery is able to include controlling the charging current into the first charging station battery to properly control charging and limit overcharging.

After performing any of the above configurations as are achieved at 310, 314, and 318, the charging station control process 300 returns to determining, at 302, if an energy harvesting device is producing energy. If it is determined, either initially or upon return at 302, that the energy harvesting device is not producing energy, the charging station control process 300 proceeds in a manner similar to that described above except that no connections are made between the energy harvesting device and any other components, such as rechargeable batteries. In particular, if it is determined, at 302, that the energy harvesting device is not producing energy, the charging station control process 300 determines, at 319, the first battery capacity, which is the present capacity of the first charging station battery, and then determines at 320, if the first battery capacity is above a threshold. If it is determined that the first battery capacity is above the threshold, the first charging station battery is connected, at 322, to the charging output.

If it is determined, at 320, that the first battery capacity is not above the threshold, the charging station control process determines, at 321, the second battery capacity, which is the present capacity of the second charging station battery, and determines, at 324, if the present capacity of the second charging station battery is above a threshold. As discussed above the threshold to which the second charging station battery is compared is able to be different than or the same as the threshold to which the first charging station battery is compared. Further, the threshold or thresholds used when it is determined that the energy harvesting device is producing energy is or are able to be the same as or different than the threshold or thresholds that is or are used when the energy harvesting device is not producing energy.

If it is determined that the second charging station battery capacity is above the threshold, the second charging station battery is connected, at 326, to the charging output. If it is determined, at 324, that the second battery capacity is not above the threshold, the rechargeable device connected to the charging output is not able to be provided with charging energy. In this condition, or after connecting either the first charging station battery, at 322, or the second charging station battery, at 326, to the charging output, the charging station control process 300 returns to determining, at 302, if an energy harvesting device is producing energy.

Figure 4:
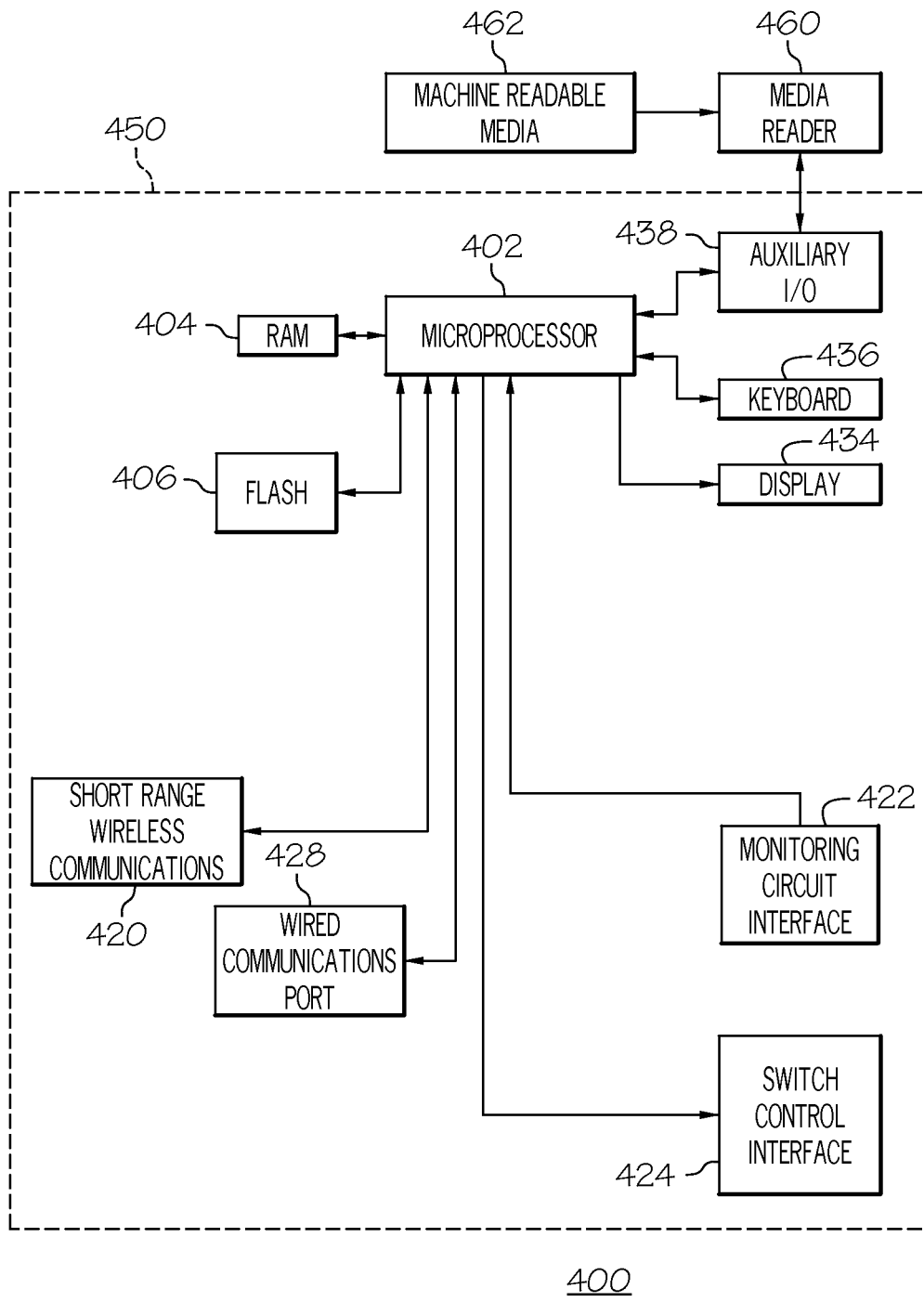
FIG. 4 is a charging station controller block diagram, with which the systems and methods disclosed herein may be implemented.

FIG. 4 is a charging station controller block diagram 400, with which the systems and methods disclosed herein may be implemented. In one example, the charging station controller block diagram 400 includes a charging controller 450 that is able to perform the functions of the charging controller 208, which are described above.

The charging controller 450 includes a microprocessor 402 that performs the processing of the methods executed by the charging controller 450. The microprocessor 402 interacts with various components of the charging controller 450 and through appropriate interfaces also interacts with other components of a charging station, as is described above. The microprocessor 402 interacts with other controller subsystems such as flash memory 406, random access memory (RAM) 404, auxiliary input/output (I/O) device 438, wired communications port 428, display 434, keyboard 436, a short-range wireless communications subsystem 420, one or more monitoring circuit interface 422, and a switch control interface 424.

The wired communications port 428 is able to support data communications between the charging controller 450 and other devices through various modes of data communications, such as high speed data transfers over electrically conductive or optical communications circuits. The wired communications port 428 is able to support communications with, for example, an external computer or other device. In some examples, the wired communications port 428 is able to include electrical power connections to provide externally provided electrical power to the charging controller 450, deliver electrical power from the charging controller 450 to other externally connected devices, or both. The wired communications port 428 is also able to exchange data with, for example, rechargeable devices connected charging station that is controlled by the charging controller 450, energy harvesting devices providing energy to the charging station that is controlled by the charging controller 450, or both.

A short-range wireless communications subsystem 420 provides data communication between the charging controller 450 and different systems or devices, which need not necessarily be similar devices. For example, the short-range wireless communications subsystem 420 is able to include an infrared device and associated circuits and components, or a Radio Frequency based communication module such as one supporting Bluetooth® communications, to provide for communication with similarly-enabled systems and devices, including the data file transfer communications described above. In various examples, the short rage wireless communications system 420 is able to exchange data with rechargeable devices connected charging station that is controlled by the charging controller 450, energy harvesting devices providing energy to the charging station that is controlled by the charging controller 450, or both.

The microprocessor 402 is connected to a monitoring circuit interface 422. The monitoring circuit interface 422 supports data exchange between the microprocessor 402 and monitoring devices contained within, for example, interfaces with monitoring circuits that are contained in a charging station controlled by the charging controller 450. Examples of such monitoring circuits include the ammeters and voltmeters described above with regards to FIG. 2. In general, the monitoring circuit interface conditions and otherwise processes data produced by those monitoring circuits to produce a digital representation of monitored values that is able to be received by the microprocessor 402.

The microprocessor 402 is connected to a switch control interface 424. The switch control interface 424 allows the microprocessor to control the state of switches contained within, for example, a charging station controlled by the charging controller 450. Examples of such switches include the first input switch 204, the second input switch 206, the third input switch 238, the first output switch 242 and the second output switch 244 that are described above with regards to FIG. 2.

The charging controller 450 further includes a user interface that has a keyboard 436 and a display 434. The display 434 presents information to a user, such as a status of a charging station that is being controlled by the charging controller 450. The keyboard 436, with optional assistance of prompts provided through display 434, is able to allow a user to enter information to configure, control, or otherwise interact with the operation of the charging controller 450.

Operating system software used by the microprocessor 402 in one example is stored in flash memory 406. Further examples are able to use a battery backed-up RAM or other non-volatile storage data elements to store operating systems, other executable programs, or both. The operating system software, device application software, or parts thereof, are able to be temporarily loaded into volatile data storage such as RAM 404.

The microprocessor 402, in addition to its operating system functions, is able to execute software that controls a charging station that is controlled by the charging controller 450. The microprocessor 402 is also able to perform other functions that may or may not be related to operation of a charging station. For example, the charging station controller 450 is able to be a microprocessor within a device that performs charging station functions, as is described above, and that also performs other functions. In one example, the charging station controller 450 is able to be incorporated into and configured to control the operation of a larger energy harvesting control system, and possibly a larger facility management system, that controls not only conveying charging energy to rechargeable devices or power packs, but also performs other functions that may or may not be related to controlling or monitoring energy harvesting devices.

A media reader 460 is able to be connected to an auxiliary I/O device 438 to allow, for example, loading computer readable program code of a computer program product into the charging controller 450 for storage into the flash memory 406 or RAM 404. One example of a media reader 460 is an optical drive such as a CD/DVD drive, which may be used to store data to and read data from a computer readable medium or storage product such as computer readable storage media 462. Examples of suitable computer readable storage media include optical storage media such as a CD or DVD, magnetic media, or any other suitable data storage device. Media reader 460 is alternatively able to be connected to the electronic device through the wired communications port 428 or the short range wireless communications subsystem 420.

Figure 5:
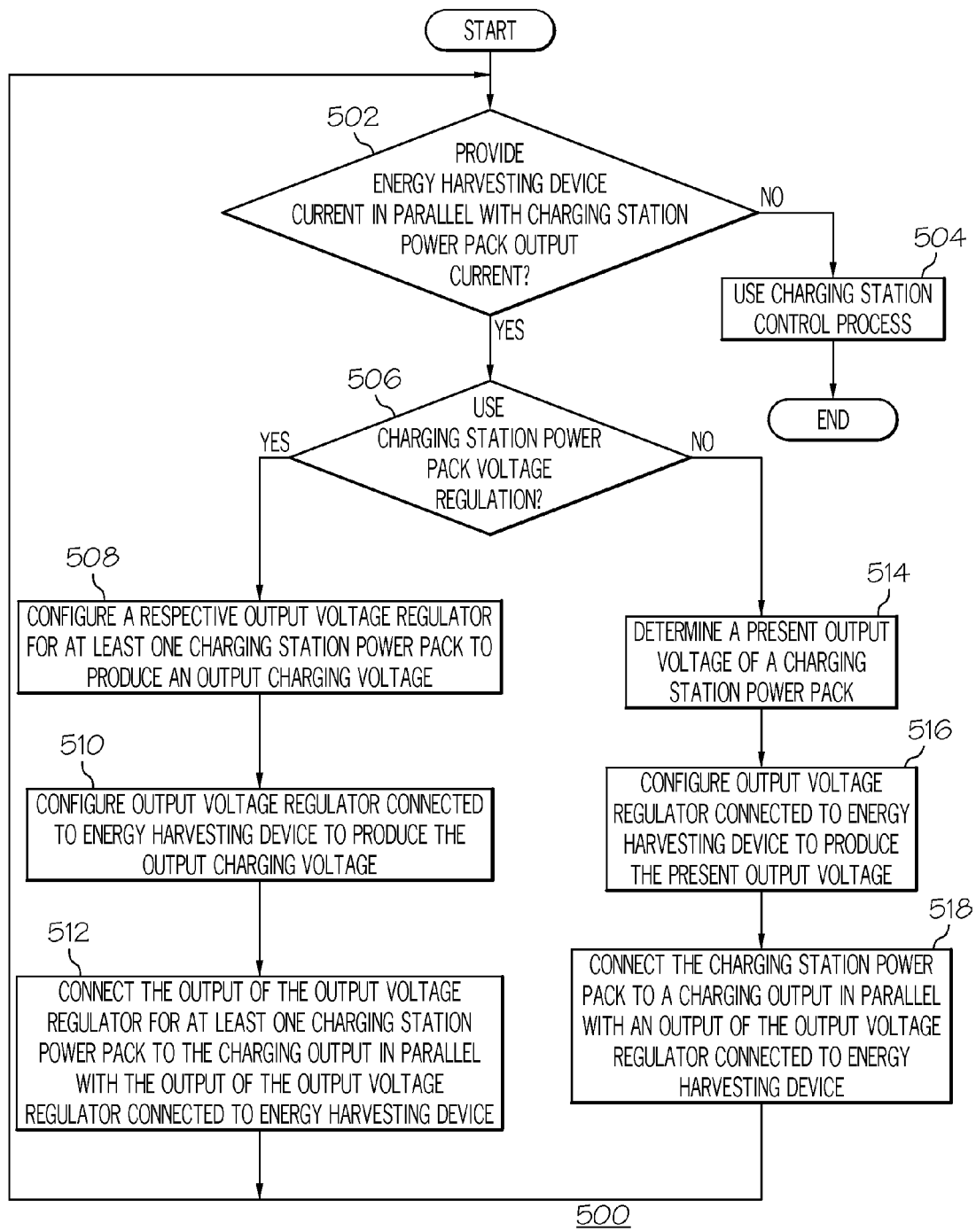
FIG. 5 illustrates a parallel energy harvesting device operating process, in accordance with one example.

FIG. 5 illustrates a parallel energy harvesting device operating process 500, in accordance with one example. The parallel energy harvesting device operating process 500 operates to cause a charging station, such as is described above, to provide increased electrical charging current to a connected rechargeable device by configuring a connected energy harvesting device in parallel with one or more charging station power packs. The following description refers to components of the charging station circuit diagram 200, as discussed above with respect to FIG. 2, as examples of components used to implement portions of the parallel energy harvesting device operating process 500.

The parallel energy harvesting device operating process 500 begins by determining, at 502, if electrical current from an energy harvesting device is to be provided in parallel to a charging output along with the electrical current produced by a charging station power pack. In various examples, determining whether to provide electrical current from the energy harvesting device in parallel with electrical current produced by one or more charging station power packs is able to be based upon the remaining capacity of the charging station power packs, the magnitude of electrical output current produced by the energy harvesting device, a user provided recharging time input, or any other criteria.

In the event that it is determined to not provide electrical current from an energy harvesting device in parallel with the electrical current produced by a charging station power pack, the parallel energy harvesting device operating process 500 proceeds by using, at 504, a conventional charging station control process, such as the charging station control process 300 described above. In further examples, any other charging station control process is able to be used. The process then ends.

Returning to a positive determination, at 502, of whether electrical current from an energy harvesting device is to be provided in parallel, the parallel energy harvesting device operating process 500 proceeds by determining, at 506, if charging station power pack voltage regulation is to be used. In one example, the charging station power pack is able to be connected to a charging output without a voltage regulator between the charging station power pack and the charging output. In an alternative example, a charging station power pack is able to provide electrical charging current to a rechargeable device connected to the charging output through a voltage regulator that operates to maintain a specified voltage at which the electrical charging current is delivered to the rechargeable device. In examples that include voltage regulators between the charging station power pack and the charging output, it is further possible to configure the voltage regulator to not perform voltage regulation. In general, the determination to use charging station power pack regulation voltage regulation is a configuration parameter for the charging station that is selected during design or based upon an operating mode of the charging station.

When it is determined to use charging station power pack voltage regulation, the parallel energy harvesting device operating process 500 in one example configures, at 508, a respective output voltage regulator connected to at least one charging station power pack to produce an output charging voltage. In further examples, the output voltage regulators connected to charging station power packs are pre-configured to produce a particular output voltage that is the output charging voltage and no separate configuration of the output charging voltage is performed. In such examples, the controller performing the parallel energy harvesting device operating process 500 is configured with that output charging voltage value.

The parallel energy harvesting device operating process 500 proceeds to configure, at 510, the output voltage regulator connected to energy harvesting device to produce the output charging voltage. In various examples, the output charging voltage is determined either by a previous configuration of the output voltage regulator connected to the charging station power pack, or by a configuration of a pre-set value for which the output voltage regulator connected to the charging station power pack is configured. By configuring the output voltage regulator connected to the energy harvesting device to produce an output voltage that is the output charging voltage of the output voltage regulators connected to charging station power packs, the rechargeable device receives an effective combination of the electrical charging current produced by both the charging station power pack and the energy harvesting device.

The parallel energy harvesting device operating process 500 continues by connecting, at 512, the output of the output voltage regulator for at least one charging station power pack to the charging output in parallel with the output of the output voltage regulator connected to energy harvesting device. In this configuration, the electrical charging current produced by the at least one charging station power pack and the energy harvesting device are effectively added and thus cause the charging station to deliver a higher electrical charging current to the rechargeable device connected to the charging output. Referring to the charging station circuit diagram 200, the connection of the output voltage regulator for at least one charging station power pack to the charging output in parallel with the output of the output voltage regulator connected to energy harvesting device is performed by closing the third input switch 238 along with closing either one or both of the first output switch 242 and the second output switch 244.

Returning to a negative determination, at 506, of whether to use charging station power pack voltage regulation, the parallel energy harvesting device operating process 500 in one example determines, at 514, a present output voltage of a charging station power pack. In various examples, a voltmeter, such as the above described first voltmeter 220 and the second voltmeter 222, is a power pack voltage monitor that is configured to determine, by measuring, the output voltage of a particular charging station power pack to determine its present output voltage. In such an example, an estimation of voltage drops between the output of the charging station power pack and the charging output 240 are able to be used to improve the determination of the charging station output voltage. In one example, output voltage regulators are not used between the charging station power packs and the charging output.

The parallel energy harvesting device operating process 500 proceeds to configure, at 516, the output voltage regulator connected to energy harvesting device to produce the present output voltage. In one example, the third buck-boost regulator 234 is able to be configured to produce the present output voltage, which corresponds to the measured output voltage of the charging station power pack. In one example, the third buck-boost regulator 234 is configured in response to receiving, from the voltmeter, the present output voltage value and in response to determining that the energy harvesting device is producing energy.

The parallel energy harvesting device operating process 500 continues by connecting, at 518, the charging station power pack to a charging output in parallel with an output of the output voltage regulator connected to energy harvesting device. In one example, this connecting is performed in response to receiving the present output voltage value and determining that the energy harvesting device is producing energy.

The parallel energy harvesting device operating process 500 describes configuring an output voltage of an output voltage regulator connected to an energy harvesting device to either the output charging voltage of an output voltage regulator connected to a charging station power pack, or to the present output voltage of a charging station power pack. In one example, the output voltage regulator connected to an energy harvesting device is able to be configured to produce an output voltage that is substantially equal to either the output charging voltage or to the present output voltage of the charging station power pack. In this example, the output voltage of the output voltage regulator connected to an energy harvesting device is substantially equal to a voltage of an energy source with which it is connected in parallel to a charging output when electrical current produced by both the energy harvesting device and the charging station power pack is delivered to a rechargeable device connected to the charging output.

In the above described example of configuring an output voltage of an output voltage regulator connected to an energy harvesting device to either the output charging voltage of an output voltage regulator connected to a charging station power pack, an alternative example is able to determine that the output voltage regulator connected to energy harvesting device is configured to produce a particular output voltage, and then configure the output voltage regulator connected to a charging station power pack to produce substantially that particular output charging voltage.

FIG. 6 is a block diagram of an electronic device and associated components 600 in which the systems and methods disclosed herein may be implemented. In this example, an electronic device 652 is a wireless two-way communication device with voice and data communication capabilities. In one example, the electronic device 652 is a portable electronic device that is also a handheld electronic device. Such electronic devices communicate with a wireless voice or data network 650 using a suitable wireless communications protocol. Wireless voice communications are performed using either an analog or digital wireless communication channel. Data communications allow the electronic device 652 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 652 is an example electronic device that includes two-way wireless communications functions. Such electronic devices incorporate communication subsystem elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication subsystem is dependent upon the communication network and associated wireless communications protocols with which the device is intended to operate.

The electronic device 652 includes a microprocessor 602 that controls the overall operation of the electronic device 652. The microprocessor 602 interacts with the above described communications subsystem elements and also interacts with other device subsystems such as flash memory 606, random access memory (RAM) 604, auxiliary input/output (I/O) device 638, USB Port 628, display 634, keyboard 636, speaker 632, microphone 630, a short-range communications subsystem 620, a battery capacity monitor 622, a harvested energy storage and switching component 626, and any other device subsystems. In one example, the term operational circuit is used to refer to one or more of the microprocessor 602, auxiliary input/output (I/O) device 638, USB Port 628, display 634, keyboard 636, speaker 632, microphone 630, short-range communications subsystem 620, and other device subsystems within the electronic device 652.

A battery 624 in one example is a rechargeable power pack that is able to be recharged by energy harvesting device 654. Energy harvesting devices 654 are similar to those described above and include devices that harvest energy from solar, wind, or other sources and produce electrical current used to recharge the battery 624. The battery 624 is connected to a battery capacity monitor 622 that monitors the capacity, including the state of charge, and other conditions of the battery 624. The battery 624 is further connected to the harvested energy storage and switching component 626, which provides electrical charging current derived from the energy harvesting device 654.

The harvested energy storage and switching component 626 in one example performs the functions of the charging station 250, described in detail above with regards to FIG. 2. The harvested energy storage and switching component 626 in one example is incorporated into an electronic device 652 in order to perform the above described functions to recharge the battery 624 of the electronic device 652. The harvested energy storage and switching component 626 receives electrical energy from the energy harvesting device 654 and stores that energy in two internal power packs that are contained in the harvested energy storage and switching component 626. The two internal power packs contained within the harvested energy storage and switching component 626 are comparable to the first charging station power pack 210 and the second charging station power pack 212, discussed above.

A battery 624 in one example is a rechargeable power pack that is able to be recharged through the harvested energy storage and switching component 626 with energy harvested by the energy harvesting device 654. The battery 624 is also able to be recharged by electrical current provided by other sources (not shown), including electrical current provided through the USB port 1128. The illustrated example shows one energy harvesting device 654 that is external to the electronic device 652. In further examples, multiple energy harvesting devices are able to be used. One or more energy harvesting devices are also able to be included in the electronic device 652.

The USB port 628 provides data communication between the electronic device 652 and one or more external devices. Data communication through USB port 628 enables a user to set preferences through the external device or through a software application and extends the capabilities of the device by enabling information or software exchange through direct connections between the electronic device 652 and external data sources rather than through a wireless data communication network.

Operating system software used by the microprocessor 602 is stored in flash memory 606. Further examples are able to use a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604.

The microprocessor 602, in addition to its operating system functions, is able to execute software applications on the electronic device 652. A set of applications that control basic device operations, including at least data and voice communication applications, is able to be installed on the electronic device 652 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 652 through, for example, the wireless network 650, an auxiliary I/O device 638, USB port 628, short-range communications subsystem 620, or any combination of these interfaces. Such applications are then able to be installed by a user in the RAM 604 or a non-volatile store for execution by the microprocessor 602.

In a data communication mode, a received signal such as a text message or web page download is processed by the communication subsystem, including wireless receiver 612 and wireless transmitter 610, and communicated data is provided the microprocessor 602, which is able to further process the received data for output to the display 634, or alternatively, to an auxiliary I/O device 638 or the USB port 628. A user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication subsystem.

For voice communications, overall operation of the electronic device 652 is substantially similar, except that received signals are generally provided to a speaker 632 and signals for transmission are generally produced by a microphone 630. Alternative voice or audio I/O subsystems, such as a voice message recording subsystem, may also be implemented on the electronic device 652. Although voice or audio signal output is generally accomplished primarily through the speaker 632, the display 634 may also be used to provide an indication of the identity of a calling party, the duration of a voice call, or other voice call related information, for example.

A short-range communications subsystem 620 is a further optional component which may provide for communication between the electronic device 652 and different systems or devices, which need not necessarily be similar devices. For example, the short-range communications subsystem 620 may include an infrared device and associated circuits and components or a Radio Frequency based communication module such as one supporting Bluetooth® communications, to provide for communication with similarly-enabled systems and devices.

A media reader 660 is able to be connected to an auxiliary I/O device 638 to allow, for example, loading computer readable program code of a computer program product into the electronic device 652 for storage into flash memory 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the USB port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. Notably, although the present subject matter may be applied in the design and implementation of systems covering a wide scale of sizes and weights, many examples discussed above are able to be realized using components that are comparatively small and lightweight, and that are able to be arranged in a compact way. Some examples of systems incorporating these principles are able to be portable (i.e., readily movable from place to place, often without need of machinery), and some examples are able to be handheld, that is, sized and shaped to be held or carried in a human hand.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for controlling a charging station, the method comprising:
    monitoring a first power pack capacity of a first power pack connected to a charging station;
    monitoring a second power pack capacity of a second power pack connected to the charging station;
    configuring, in response to determining an energy harvesting device is producing energy and in response to determining that the first power pack capacity and the second power pack capacity are both below a respective threshold, the energy harvesting device to deliver charging current to a charging output of the charging station;
    in response to determining that the energy harvesting device is producing energy and in response to determining that the first power pack capacity is below a first threshold and that the second power pack capacity is above a second threshold, configuring the energy harvesting device to deliver charging current to the first power pack and configuring the second power pack to deliver charging current to the charging output; and
    in response to determining that the energy harvesting device is not producing energy and determining that the first power pack capacity is below the first threshold and that a second power pack capacity is above the second threshold, configuring the second power pack to deliver charging current to the charging output.

2. The method of claim 1, wherein the first threshold equals the second threshold.

3. The method of claim 1, further comprising:
    configuring, in response to determining that the energy harvesting device is producing energy and in response to determining that the second power pack capacity is below the second threshold and that the first power pack capacity is above the first threshold, the energy harvesting device to deliver charging current to the second power pack and configuring the first power pack to deliver charging current to the charging output.

4. The method of claim 1, further comprising:
    configuring, in response to determining that the energy harvesting device is not producing energy and determining that the first power pack capacity is above the first threshold and that the second power pack capacity is below the second threshold, the first power pack to deliver charging current to the charging output.

5. The method of claim 1, further comprising:
    determining a present first power pack output voltage of the first power pack;
    configuring, in response to determining the present first power pack output voltage of the first power pack and determining that the energy harvesting device is producing energy, an output voltage regulator connected to the energy harvesting device to produce the present first power pack output voltage; and
    configuring, in response to determining the present first power pack output voltage of the first power pack and determining that the energy harvesting device is producing energy, the first power pack and the output voltage regulator to deliver, in parallel with one another, charging current to the charging output.

6. The method of claim 1, wherein the energy harvesting device comprises an electrical generator powered by a renewable energy source.

7. The method of claim 1, further comprising:
    configuring, based on determining that the energy harvesting device is producing energy and in response to determining that the first power pack capacity is above a first threshold, a second buck-boost voltage regulator having an input coupled to the first power pack to produce a determined output voltage that is based on a charging output voltage delivered to the charging output; and
    configuring, based on configuring the second buck-boost voltage regulator, a first buck-boost voltage regulator having an input coupled to the energy harvesting device, to produce the determined output voltage, wherein an output of the first buck-boost voltage regulator is coupled to an output of the second buck-boost voltage regulator.

8. The method of claim 5,
    wherein the output voltage regulator connected to the energy harvesting device comprises a first buck-boost voltage regulator with a first electrical current input that is configured to receive electrical current from the energy harvesting device and that is electrically isolated from the first power pack,
    wherein the first buck-boost voltage regulator has an electrical current output electrically coupled, independently of the first buck-boost voltage regulator, to an output of the first power pack, and
    wherein configuring the output voltage regulator connected to the energy harvesting device to produce the present first power pack output voltage comprises configuring, based on determining the first power pack output voltage, the first buck-boost voltage regulator to produce an output at the first power pack output voltage.

9. A device charging station, comprising:
    a power pack capacity monitor configured to monitor a first power pack capacity of a first power pack and to monitor a second power pack capacity of a second power pack;
    a charging output connector configured to detachably connect to a rechargeable device;
    a device charging controller, coupled to the power pack capacity monitor, configured to:

configure, in response to a determination that an energy harvesting device is producing energy and in response to a determination that the first power pack capacity and the second power pack capacity are both below a respective threshold, the energy harvesting device to deliver charging current to the charging output connector;

configure, in response to the determination that the energy harvesting device is producing energy and in response to a determination that the first power pack capacity is below a first threshold and that the second power pack capacity is above a second threshold, the energy harvesting device to deliver charging current to the first power pack and configuring the second power pack to deliver charging current to the charging output connector; and configure, in response to a determination that the energy harvesting device is not producing energy and a determining that the first power pack capacity is below the first threshold and that the second power pack capacity is above the second threshold, the second power pack to deliver charging current to the charging output connector.

10. The device charging station of claim 9, wherein the first threshold equals the second threshold.

11. The device charging station of claim 9, the device charging controller further configured to configure, in response to a determination that the energy harvesting device is producing energy and in response to a determination that the second power pack capacity is below the second threshold and that the first power pack capacity is above the first threshold, the energy harvesting device to deliver charging current to the second power pack and configuring the first power pack to deliver charging current to the charging output connector.

12. The device charging station of claim 9, the device charging controller further configured to configure, in response to a determination that the energy harvesting device is not producing energy and a determination that the first power pack capacity is above the first threshold and that the second power pack capacity is below the second threshold, the first power pack to deliver charging current to the charging output connector.

13. The device charging station of claim 9, further comprising:
a power pack voltage monitor configured to determine a present output voltage value of the first power pack, and
wherein the device charging controller is coupled to the power pack voltage monitor, and the device charging controller is further configured to:
configure, in response to receiving the present output voltage value of the first power pack and in response to the determination that the energy harvesting device is producing energy, an output voltage regulator connected to the energy harvesting device to produce the present output voltage; and
configure, in response to receiving the present output voltage value of the first power pack and in response to the determination that the energy harvesting device is producing energy, the first power pack and the output voltage regulator to deliver, in parallel with one another, charging current to the charging output.

14. The device charging station of claim 9, wherein the energy harvesting device comprises an electrical generator powered by a renewable energy source.

15. The device charging station of claim 14, wherein the energy harvesting device comprises at least one of a solar cell and a wind powered electrical generator.

16. A computer program product for controlling a charging station, the computer program product comprising:
a computer readable storage medium having computer readable program code embodied therewith, the computer readable program code comprising instructions for:
monitoring a first power pack capacity of a first power pack connected to a charging station;
monitoring a second power pack capacity of a second power pack connected to the charging station;
configuring, in response to determining an energy harvesting device is producing energy and in response to determining that the first power pack capacity and the second power pack capacity are both below a respective threshold, the energy harvesting device to deliver charging current to a charging output of the charging station;
in response to determining that the energy harvesting device is producing energy and in response to determining that the first power pack capacity is below a first threshold and that the second power pack capacity is above a second threshold, configuring the energy harvesting device to deliver charging current to the first power pack and configuring the second power pack to deliver charging current to the charging output; and
in response to determining that the energy harvesting device is not producing energy and determining that the first power pack capacity is below the first threshold and that the second power pack capacity is above the second threshold, configuring the second power pack to deliver charging current to the charging output.

17. The computer program product of claim 16, wherein the first threshold equals the second threshold.

18. The computer program product of claim 16, further comprising:
configuring, in response to determining that the energy harvesting device is producing energy and in response to determining that the second power pack capacity is below the second threshold and that the first power pack capacity is above the first threshold, the energy harvesting device to deliver charging current to the second power pack and configuring the first power pack to deliver charging current to the charging output.

19. The computer program product of claim 16, further comprising:
determining a present output voltage of the first power pack;
configuring, in response to determining the present output voltage of the first power pack and determining that the energy harvesting device is producing energy, an output voltage regulator connected to the energy harvesting device to produce the present output voltage; and
configuring, in response to determining the present output voltage of the first power pack and determining that the energy harvesting device is producing energy, the first power pack and the output voltage regulator to deliver, in parallel with one another, charging current to the charging output.

20. An electronic device, comprising:
an operational circuit;
a rechargeable power pack;
an energy harvesting device interface; and
a harvested energy storage and switching component, coupled to the energy harvesting device interface and the rechargeable power pack, comprising:
a power pack capacity monitor configured to monitor a first power pack capacity of a first power pack and to monitor a second power pack capacity of a second power pack, the first power pack and the second power pack being different from the rechargeable power pack;
a device charging controller, coupled to the power pack capacity monitor, configured to:
configure, in response to a determination that an energy harvesting device coupled to the energy harvesting device interface is producing energy and in response to a determination that the first power pack capacity and the second power pack capacity are both below a respective threshold, the energy harvesting device to deliver charging current to the rechargeable power pack;
configure, in response to the determination that the energy harvesting device is producing energy and in response to a determination that the first power pack capacity is below a first threshold and that the second power pack capacity is above a second threshold, the energy harvesting device to deliver charging current to the first power pack and configuring the second power pack to deliver charging current to the rechargeable power pack; and
configure, in response to a determination that the energy harvesting device is not producing energy and a determining that the first power pack capacity is below the first threshold and that the second power pack capacity is above the second threshold, the second power pack to deliver charging current to the rechargeable power pack.

\* \* \* \* \*